Jan. 17, 1928.　　　　　　　　　　　　　　　1,656,850
R. ALKAN ET AL
GEAR FOR AERIAL BOMBARDMENTS
Filed March 5, 1926　　　　2 Sheets-Sheet 1
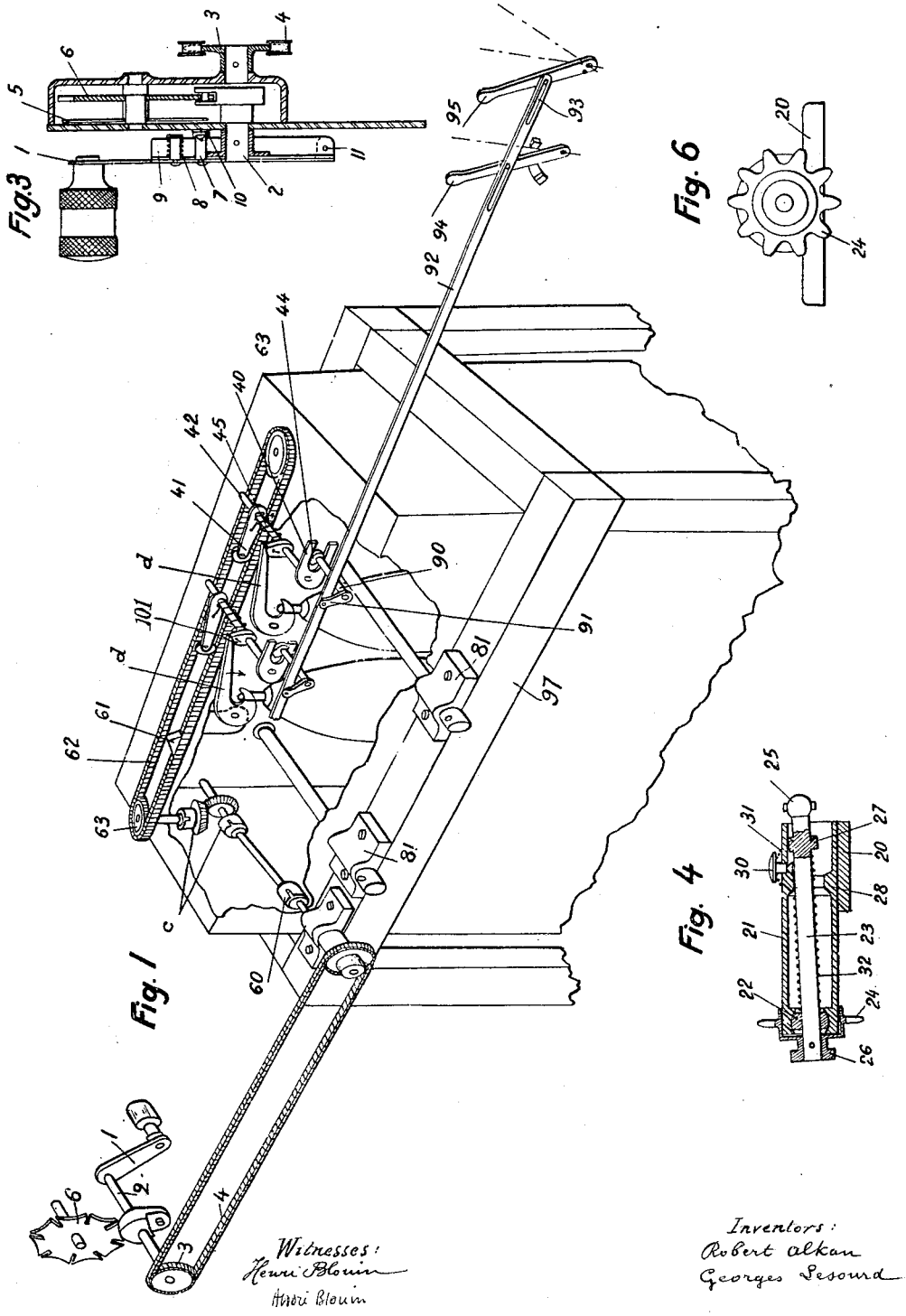

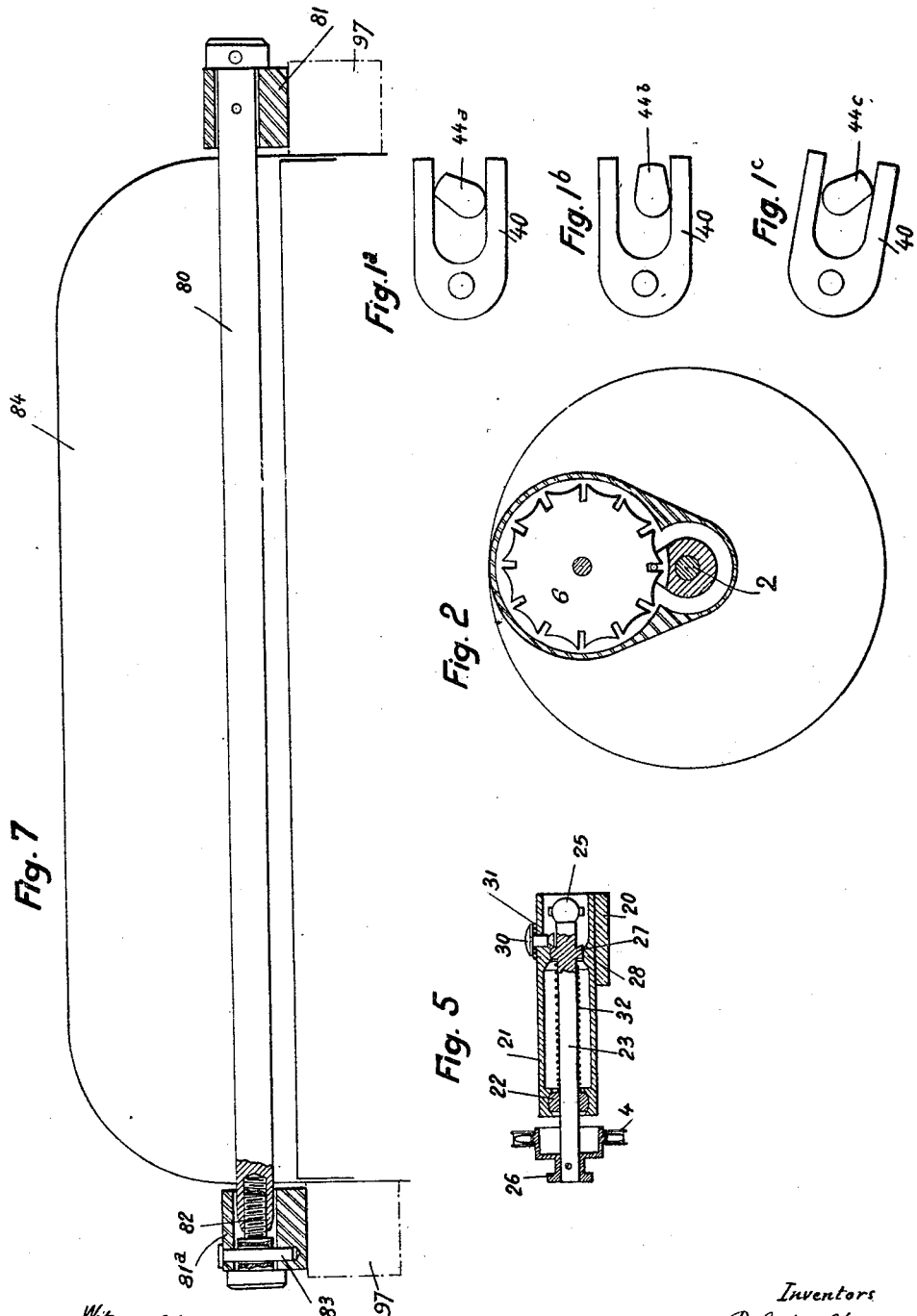

Patented Jan. 17, 1928.

1,656,850

UNITED STATES PATENT OFFICE.

ROBERT ALKAN AND GEORGES LESOURD, OF PARIS, FRANCE.

GEAR FOR AERIAL BOMBARDMENTS.

Application filed March 5, 1926, Serial No. 92,492, and in France March 9, 1925.

The present invention has for its object a mechanical gear chiefly applicable to airplanes and air-ships adapted to support and to automatically ease off, by means of a distant drive, any bombarding, signalling or other object.

This whole gear is so devised as to allow:

1.—To utilize an individual releasing device presenting the following features:

(a) It allows the automatic attachment of the bomb or other part;

(b) It possesses a complete security of fastening by means of a mechanical lock;

(c) It affords the possibility of causing the release through a safety drive which is independent from the main drive.

(d) It is provided with a strain limiting device allowing the same to receive an impulse of an amplitude which is substantially higher than the one which is required releasing a projectile and for allowing the main drive to operate when it is itself locked.

2.—To obtain the successive operation of the individual releasing devices, the one after the other, or volley after volley, by means of parts having a large angular or rectilinear displacement, in such a manner that the regular operation of the whole does not require a pointing of great accuracy and is not influenced by the mechanical actions of construction or of wear of the several devices.

For this purpose, the whole of the mechanism comprises: a driving member which allows to determine at a distance the operation of the release devices; connecting members which connect this driving member with the releasing devices; individual releasing members corresponding to a certain number of articles to be dropped and so connected as to form a complete apparatus; the parts securing the fastening to the airship and the safety driving parts, as well as the parts controlling the emergency releasing device.

In the accompanying drawings

Fig. 1 is a perspective general view.

Figs. 1ª, 1ᵇ, 1ᶜ show the different positions of the operation of a releasing cam.

Figs. 2 and 3 show respectively, in part sectional front view and in cross section, the driving members.

Figs. 4, 5 and 6 show in longitudinal section in two different positions and in front view the connecting parts.

Fig. 7 shows, on a larger scale, the fastening members.

The gear forming the object of the invention comprises:

I.—The rotary operating device (Figs. 1, 2 and 3) comprises a crank handle 1 driven by hand, on the axle 2 of which a pinion 3 of a Gall's chain 4 is keyed which is thus moved by the rotation of the crank handle and actuates at a distance the projectile-releasing devices, one or several of these devices being actuated at every complete revolution of the crank handle. A dial 5, rigid with a Maltese cross 6 operated from the axle of the crank handle and rotating at each rotation of the crank handle through the space of one tooth, indicates the number of volleys fired or the number of volleys remaining to be fired in accordance with the kind of graduation adopted.

The starting point of the crank is indicated by a safety lock which prevents any involuntary release.

The crank 1 is articulated at 11 by a lug formed at the rear of its plan to the part 9 fast upon the axis 2. A spring 8 tends to maintain the crank against the part 9, the claw 7 carried by this crank entering then into a notch or recess formed upon the fixed wall of the gear case. In order to operate the crank, it is then necessary to pull the same forwardly against the action of the spring 8 so as to disengage its claw 7.

II.—Connecting parts (Figs. 1, 4, 5, 6) driven by the chain 4 with the purpose of allowing, without it being necessary to dismount the driving members and without any disadjustment, to take apart the bomb-thrower, this chain acting upon an intermediate feeding device provided with an uncoupling device. This device comprises a base 20 carrying a body 21 supporting a spherical ball bearing 22 in which is adapted an axle 23 carrying the pinion 24 actuated by the chain 4. The ball bearing 22 allows the said axle to move within the limits of a cone determined by the size of the body 21 and to transmit the rotary motion whatever the position of the said axle may be. The claw sphere 25 which terminates this axle can therefore find the part of the bomb-thrower upon which it is adapted to act in a position which is substantially different from the theoretical position as defined by the axis of construction of the body. Accordingly and in virtue of the fact that the spherical ball bearing always remains in the middle plan of the driving chain, allowances of construction and differences of mounting are possible without hindering the transmission of motion.

In order to secure the release of the drive, one draws the button 26; the sphere 25 is disengaged and enters into the body at the same time as the axle 23 slides into the inner ring of the bearing. The collar 27 of this axle then places itself in the bearing 28 of the body and one presses the button 30 which fixes itself to the collar 27 which is maintained by the action of the spring 32. The axle 23 is thus maintained between the bearing 22 and the bearing 28 thereby allowing to cause, for trying purposes, the commanding post and the chain in the released or disengaged position of the driving member.

In order to put in gear, it is only necessary to pull the button 26; the button 30 will be disengaged under the influence of the spring 31 and the axle 23, pushed by the spring 32, assumes its coupling position.

III.—Releasing parts the whole of which constitutes a bomb-thrower which contains a certain number of bombs or the like to be eased off and which supports all the release devices with their operating mechanism (Fig. 1).

The release devices can be constituted by apparatuses of a known system, for example devices in which the stress required for determining the release is reduced by a system of suitable levers, this release being determined by a small angular displacement of the yoke 40. The movement of this lever is produced by a cam 44 which can steady the same in its position 44ᵃ (Fig. 1ᵃ) which is the one corresponding to the locking of the absolute safety device. In the position 44ᵇ (Fig. 1ᵇ) the yoke 40 can move under the influence of an external action; this means the charging position or the position of release by the main drive. Finally, in the position 44ᶜ (Fig. 1ᶜ), the cam depresses the yoke 40 and the release takes place; this is the emergency release position. To these already known parts must be added a lever 41 which receives the impulse given by the general drive.

The movement received by the lever 41 loosely mounted upon the axle 42 is transmitted, by the strain limiting spring 45 adjusted with a suitable initial tension, to the yoke 40 until the latter has reached its abutment; at this moment, the spring yields until the lever 41 has reached its outmost position. It is therefore possible to impart to said lever 41 a movement of such an amplitude that the general drive will not require the accuracy it would necessitate in order to strictly insure the small angular displacements of the releasing yoke 40.

On the other hand, if the cam 44 is in the locking position (44ᵃ) and if the general drive is made to operate, the lever 41 is lifted but as its movement cannot be transmitted to the yoke 40 which is locked, a yielding of the spring 45 will only be produced.

The drive of the releasing devices is constituted as follows:

The claw sphere 25 of the driving member acts, in its engaging position, upon the corresponding female part 60 of the bomb-thrower which is at the start of a mechanical transmission of a known system, which, through the means of gearings and of small transmission shafts, carries over the movement upon a plate where it operates, through the pinions 63, the chain 62 carrying one or several cams 61 which successively act upon the levers 41 of the releasing devices and to effect the release of the projectiles.

The parts forming this transmission are coupled by means of universal joints $c$ so that its operation will not be affected by the allowances in the manufacture or by the distortions due to the supported loads and to the wear of the apparatus.

The elements carrying each a projectile are pivotally mounted each on a support rigid with the frame. The weight of a projectile tends to make the element $d$ oscillate in the direction of the arrow-line (Fig. 1) but this oscillating movement is prevented by a cam 101 on which the free end of the long arm of element $d$ rests. As soon as the axle 42 of this cam 101 is rotated the element $d$ is released and oscillates under the action of the weight of the projectile which then slips off the hook-shaped end of element $d$ and is dropped. The strain limiting device consists of a spiral spring 45 attached at the one end to the lever 41 and at the other end to the axle 42 of cam 101.

The pinions of the commanding post, of the connecting member and of the transmission are proportioned in such a manner that, for a revolution of the commanding post, the cam chain 62 will move according to a distance equal to the distance between two successive releasing devices.

It results therefrom that:

(a) If the initial position of the cam 61 is close to the lever 41, one will reduce the constant time which separates the shell dropping moment from the moment when the driving post has been set in motion.

(b) The excess of movement of the cam after release constitutes a guarantee against the errors of adjustment and construction.

(c) The use of the essentially deformable chain allows the same to follow the deformations of the supporting plate without any functional inconvenience.

(d) The number of cams can be regulated so as to obtain either the symmetric unballasting of the whole of the releasing devices, or the easing off of the volleys of determined composition and distribution.

IV.—Fastening members constituted by a system of spindles which can be easily dismounted and allow to rapidly fix to the airplane the frame constituted as a bomb-thrower. According to the invention (Figs. 1 and 7) the apparatus is supported by a frame 97 which receives the supports 81—81ª of the fastening spindles 80. Everyone of the said spindles passes very loosely through a smooth support 81 and the bomb-thrower 84 and enters into another support 81ª which contains a screw 82 stopped with play by a pin 83 or any other means allowing the same to move freely to a certain extent in all directions. The spindle is tapped at this end so as to be able to engage itself upon the screw. When screwing the spindle, one succeeds in locking the frame 97 to the frame of the bomb-thrower in such a manner that, when the locking is obtained, the rigidity of the frame is used for bracing the frame containing the same. The spindle 80 and the screw have their end cut in the shape of an olive so as to facilitate the introduction of the spindle into the supports and into the bomb-thrower and the introduction of the screw into the spindle.

V.—A safety drive allowing to simultaneously actuate through a system of connecting shafts 90, of a crank pin 91 and of the connecting rod or link 92, all the locking and safety cams of the releasing devices, the link 92 being operated by hand by means of the two independent slide drives 93 which enable, either to place all the mechanisms together in the position of safety, or to bring them all to the loading or firing position by means of the main drive, or to cause them to be released at the same time in case of stopping of the main drive or for any other reason.

For this purpose the lever 94 will only allow to obtain the position of loading and of firing, while the lever 95 only will allow the total release of the emergency device. the complete separation of these two functions avoiding the errors of operation.

The above indicated arrangements are given by way of example only. Other forms of construction can be carried out without altering in any way the principle of the invention, as every one of the specified parts can be considered in its applications to different apparatuses.

I claim:—

1. An apparatus for releasing projectiles from aircraft for signalling or for other purposes comprising in combination a rotary operating device adapted to cause the release of one or more projectiles at each rotation thereof, an indicating device on said operating device, means for locking said operating device at the end of each rotation thereof; a demountable flexible coupling between the operating device and the mechanism for releasing the projectiles; a series of projectile supporting and releasing devices each adapted to be operated to release the projectile through a resilient driving connection which enables the operating device to be actuated without effect when the releasing devices are locked against operation; an intermediate mechanism between the operating device and the releasing devices comprising one or more cams mounted on one or more chains moved by the operating device and so arranged that the displacement of the chain or chains between successive projectile releasing positions is sufficient to accommodate any displacements due to wear, distortion, or imperfect proportioning and fitting of the parts; means for securing the projectile supporting and releasing mechanism to a supporting frame by means of bolts in such a manner that the frame or casing of the supporting and releasing mechanism serves to stay the supporting frame, and an auxiliary operating device adapted to act simultaneously on all of the projectile releasing devices.

2. An apparatus as specified in claim 1, comprising in combination with the rotary operating device consisting of a crank handle, an intermediate piece to which said crank handle is hingedly connected, a spring retaining said intermediate piece, a pinion, a driving chain guided on said pinion, an axle of said pinion operated by said intermediate piece, a Maltese cross operated from said crank handle, a dial on said Maltese cross for indicating the number of volleys fired or remaining to be fired, and a locking stud on said crank handle.

3. In an apparatus as specified in claim 1, the demountable flexible coupling consisting of a catching device, a spherical bearing in said catching device, an axle of transmission controlled by said spherical bearing so that it can displace itself outside its theoretical position said axle being free to slide in said spherical bearing in order to be pulled back for disengaging from the element which it is designed to draw along, and a spring-controlled knob to hold said element in the disengaging position.

4. In an apparatus as specified in claim 1 the projectile releasing device comprising a releasing axle, a lever acting upon said releasing axle, a spring between said lever and said axle and constituting a resilient driving connection, a cam for controlling said lever, and a chain upon which said cam is fixed and which is driven from the rotary operating device.

5. In an apparatus as specified in claim 1, the means for securing the projectile supporting and releasing mechanism, comprising in combination with the machine frame, a casing for the supporting and releasing devices, a supporting frame, supports fixed upon said supporting frame, and a number of bolts freely engaging with said casing and with said support to hold said casing in engagement with said supporting frame in such a manner as to stay the latter.

6. In an apparatus as specified in claim 1, the auxiliary operating device comprising in combination locking cams, a connecting rod controlling said locking cams, two levers actuating said cams, one of said levers having only a limited displacement and serving only for attaching the position of loading or of firing, the other lever having a displacement of greater amplitude and serving only for the total releasing.

In testimony whereof we affix our signatures.

ROBERT ALKAN.
GEORGES LESOURD.